Sept. 15, 1964 L. O. BONRUD 3,149,059

REPRODUCTION PROCESS

Filed April 6, 1960

INVENTOR
LEON O. BONRUD
BY
Carpenter, Abbott, Coulter & Kinney
ATTORNEYS

United States Patent Office 3,149,059
Patented Sept. 15, 1964

3,149,059
REPRODUCTION PROCESS

Leon O. Bonrud, Minneapolis, Minn., assignor to Minnesota Mining and Manufacturing Company, St. Paul, Minn., a corporation of Delaware Filed Apr. 6, 1960, Ser. No. 20,295
14 Claims. (Cl. 204—143)

Figure 1:
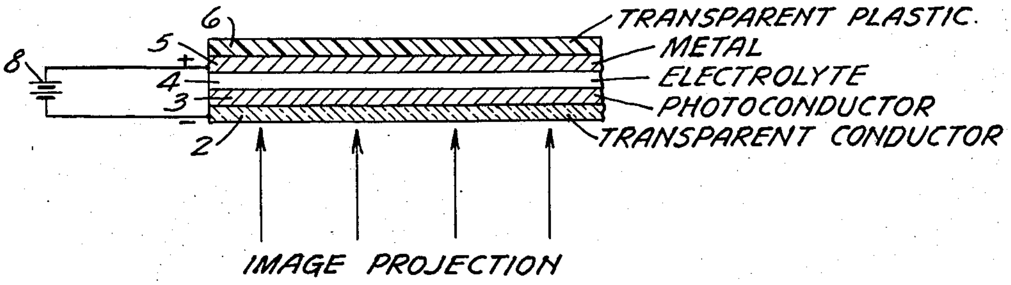

This invention relates to a reproduction process. In one aspect this invention relates to a method for the production of transparencies and positive prints.

Various photographic and reproduction processes are known in the art. However, few, if any, of these processes are able to produce a positive transparency or a positive print diretly by exposure to the image. In addition, these processes of the prior art require extensive development and fixation steps. According to this invention, these shortcomings of the prior art processes are eliminated and a positive print or a positive transparency can be made directly upon exposure to the image.

An object of this invention is to provide a new process for reproduction.

Another object of this invention is to provide a process for making positive transparencies.

Still another object of this invention is to provide a process for producing positive prints.

Another object is to simultaneously reproduce a positive and negative.

Yet another object is to provide a new method for making printed circuits and lithographic off-set plates.

A further object of this invention is to provide apparatus for effecting reproduction in accordance with the above process.

Various other objects and advantages will become apparent to those skilled in the art from the accompanying description and disclosure.

According to this invention, an image or pattern is projected onto a photoconductive carrier sheet. The photo-conductive surface containing a thus produced latent image is contacted with a metalized sheet or reproduction carrier. Metal is removed from the metalized sheet or carrier or oxidized in situ by electrolysis while in contact with the latent image on the photoconductive carrier to develop a positive print or a positive transparency. If the purpose is to produce a transparency, the substrate for the metalized sheet is a transparent film or a glass plate. On the other hand, if the purpose is to produce a positive print, the substrate of the metalized sheet or plate is opaque and light in color, such as white paper. The reproduction on the metalized carrier made in accordance with this invention can be utilized as a lithographic off-set plate, particularly where the substrate is a metal plate different from the metalized surface or where the substrate is a water-receptive paper. The elctrolysis is effected with the aid of an electrolyte between the metalized sheet or plate and the photoconductive carrier sheet or plate. The photoconductive carrier is the cathode and the metalized sheet or plate is the anode. The voltage necessary for effecting the electrolysis and the removal of metal from the metalized film is not more than about 100 volts and usually less than 50 volts of direct current.

The substrate of the metalized carrier can be made of many conventional materials and will depend upon whether a transparency, a printed circuit board, an off-set plate, or a print is desired. In the case of a transparency, plastic films may be used, such as Mylar and cellulose acetate, or transparent glass may also be used for this purpose. In the case of making a positive print, the substrate is preferably white pulp wood paper. The metalized surface of the metalized carrier may comprise various conductive electrolyzable metals which can be removed therefrom or oxidzed by electrolysis, such as copper, zinc, titanium, tin, silver, nickel and aluminum. In the case of aluminum, zinc and titanium, the metal is oxidized by the electrolysis and tartaric acid is used as the electrolyte. The oxidized metal is transparent. Preferably, the metal used is dark in color for contrast purposes, such as copper. However, in the case of transparencies, the color of the metal is not as important and therefore such metals as silver and aluminum may be utilized satisfactorily. The metal surface is placed upon the substrate of the carrier by vapor deposition or by lamination with metal foil or other conventional methods, such as electrolysis, precipitation, etc. The thickness of the metalized film on the substrate depends on the particular metal used but is generally between about 0.002 and about 5 microns, preferably between about 0.01 and about 0.1 micron. The thickness of the metalized film should be sufficient such that there is a substantial difference in light transmission through the metalized surface as compared to the surface where the metal has been removed or oxidized in the case of transparencies. The transmission of light through the metalized surface should be less than about 30 percent and preferably less than about 10 percent for a transparency. Thinner metal films may be used when a transparency is not the purpose, but, a positive print. Also, the metal surface should not be so thick that an undue length of time is required to remove the metal from the substrate by electrolysis.

The photoconductive carrier contains a photoconductor bonded to the surface thereof. Suitable photoconductors include zinc oxide, indium oxide and cadmium sulfide. The photoconductors should have a photoconductivity on light exposure of at least $10^{-7}$ mhos per cm. and preferably should have a photoconductivity between about $10^{-3}$ and about $10^{-6}$ mhos per cm. Since the development of the image is effected by electrolysis, the photoconductor should be sufficiently conductive so that a relatively low voltage may be used during electrolysis. Usually the thickness of the photoconductor on the surface is between about 0.1 and about 5 mils; preferably between about 0.5 and about 2 mils. The photoconductor is applied to the paper by various means, but, preferably the photoconductor is admixed with a suitable organic bonding agent or binder and then applied in admixture to the surface of the carrier and dried to form a layer of photoconductor bonded to the carrier. Suitable bonding agents include a copolymer of styrene and butadiene known as "Pliolite," polystyrene, chlorinated rubber, silicone resin, rubber hydrochloride, polyvinylidene chloride, nitro-cellulose and polyvinylbutyral. The binder should be a good insulator and be as nonconductive as the photoconductor in the dark. The binder should be preferably readily soluble in conventional organic solvents so that they may be applied easily to the surface in solution. The primary limitation on the binder, however, is that it be sufficiently nonconductive, having a conductivity no more than $10^{-8}$ mhos per cm. Also, the bonding agent should have adequate bonding properties to the substrate and photoconductor and is preferably hydrophobic or non-water soluble.

The substrate or carrier for the photoconductive material must be electronically conductive. Therefore, suitable carriers comprise metal plates or continuous metal films, such as copper, aluminum, nickel, silver, etc. The substrate may include paper or other materials impregnated with a conductor, such as carbon or metal particles. Glass is a good substrate when the glass surface adjacent to the photoconductor is coated with or contains stannic oxide. Stannic oxide deposited on mica paper is also suitable. The conductive portion of the carrier may be backed with a nonconductive material, such as paper, glass, wood or plastic. A suitable conductive metal surface may be achieved by vapor deposition of a metal on a nonconductive backing, such as glass or plastic. In situations in which the photoconductive carrier is exposed to the image by the projection of the image directly through the photoconductive carrier, the carrier is made of glass or transparent plastic upon which a thin film of a metal has been deposited. The thin film of metal will permit the transmission of light through the metal film to the photoconductor. Platinum, silver and gold are useful for this purpose and they may be deposited conveniently by vapor deposition. A mixture of gold and bismuth deposited on a transparent carrier is particularly suitable. A glass plate containing stannic oxide on the surface is also useful for this purpose as it transmits light and is also conductive.

Any conventional electrolyte may be utilized between the metalized carrier and the photoconductive carrier. However, preferably the electrolyte is contained in aqueous solution. The electrolyte may be organic or inorganic without departing from the scope of this invention. The electrolyte should be below the metal to be removed in the electromotive series. Preferably, the electrolyte is a metal salt and the metal thereof is preferably the same as the metal of the metalized carrier. Suitable electrolytes include silver nitrate, copper sulfate, nickelous chloride, nickel acetate, and tartaric acid. The electrolyte may be applied to the surface of the metalized carrier and the photoconductive carrier in the form of a liquid aqueous solution, a thin film of gelatin impregnated with the electrolyte and containing water or in the form of plastic material impregnated with electrolyte and containing sufficient moisture.

Figure 2:
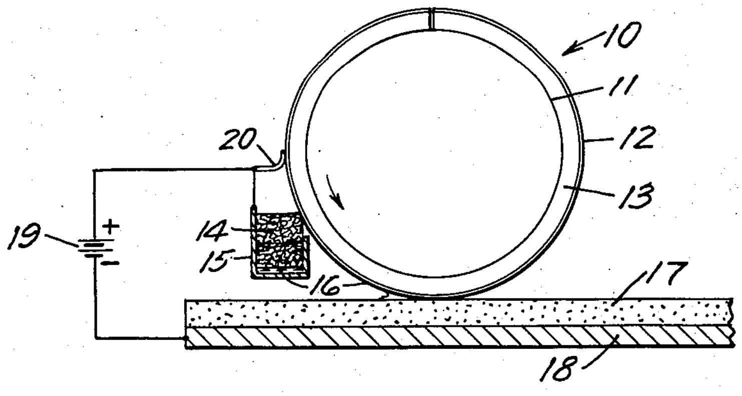

The invention may be best described by reference to the accompanying drawings. FIGURE 1 is a diagrammatical illustration of the invention and the various carrier materials in which exposure and development are effected simultaneously. FIGURE 2 is a diagrammatical illustration of apparatus suitable for effecting the process of the invention in which development is subsequent to exposure to the image. According to FIGURE 1, numeral 2 designates an electronically conductive carrier containing a photoconductive layer 3 bonded thereto. The electronically conductive carrier 2 in this embodiment of the invention is transparent, capable of transmitting at least 10 percent, preferably at least 30 percent of the light projected thereon. A suitable material for this purpose is glass containing a surface layer of stannic oxide having a surface resistance of less than 100 ohms per square or glass upon which has been vapor deposited a thin layer of about 0.01 micron of platinum or gold. Numeral 4 designates an electrolyte in suitable form, such as an aqueous solution thereof or a gelatin layer containing water and the electrolyte. Numeral 6 designates a suitable transparent plastic carrier having bonded thereto or deposited thereon a metallic layer 5. Transparent Mylar having vapor deposited thereon a 0.1 micron thick film of copper is satisfactory for the construction of the elements designated by 5 and 6. A suitable source of direct current 8 is connected through leads 7 and 9 as indicated to the metal layer 5 of the transparent carrier 6 and to the transparent conductive carrier 2.

The embodiment above described is suitable for the direct reproduction of transparencies by simultaneous exposure and development. According to the operation of FIGURE 1, the image or pattern is projected through the electronically conductive carrier 2 as shown onto photoconductive layer 3. Simultaneously, a direct current is passed from metal layer 5 through electrolyte 4 and the photoconductive layer 3. Upon passage of this current, electrolysis is effected in the lightstruck areas of the photoconductors 3 and the metal in layer 5 opposite the light-struck areas of layer 3 is passed into the electrolyte and deposited on layer 3 (forming a negative thereon). About two to three seconds time is required for the electrolysis to remove all of metal 5 from transparent carrier 6 in the light-struck areas. Thereafter, the current is discontinued and the image projection stopped. Then the unitary combination of 5 and 6 is stripped from electrolyte 4 and layer 3. This results in a positive transparency, the metal 5 remaining on layer 6 in the dark unexposed areas and the metal being removed from layer 6 corresponding to the light-struck areas of the photoconductor 3.

In the above embodiment, electrolyte layer 4 may be bonded directly to a photoconductive layer 3, if desired. A suitable electrolyte for the above operation is copper sulfate. The voltage utilized for the electrolysis is about 12 volts. The projection may be effected by any conventional means, such as by the use of a projector and a positive transparency. However, any other conventional means may be used to project the image either negative or positive onto the photoconductive layer 3. When a positive print is desired by the embodiment of FIGURE 1, white paper is substituted for the transparent plastic of carrier or substrate 6 and metal 5 is bonded to the paper. The result of this modification is a positive print.

In another modification of this invention, substrate or carrier 6 is a conductive material, such as a glass plate, with a transparent conductive surface adjacent the metal layer or a plastic film containing a different metalized surface adjacent the metal layer. In such modification, the anode is connected to the conductive substrate 6 rather than to metal layer 5. In this modification, uniform removal or oxidation of the metal layer 5 is assured at all points. Both transparencies and prints can be made in this manner. In making off-set plates, carrier 6 may comprise a metal plate, such as an aluminum plate, and layer 5 comprises a different metal, such as copper.

After the reproduction is made on carrier 6, the reproduction may be subjected to further treatments to enhance the qualities of the reproduction, such as by depositing more metal on that protion of the reproduction where the metal layer 5 remains.

According to FIGURE 2, a suitable carrier 13 comprising white paper or transparent plastic film having as a surface a thin metal film 12 approximately 0.1 micron thick, such as copper, is wrapped around a flexible roller 11 comprising gelatin with metal film 12 exposed outwardly.

A metal support 15 contains a sponge or absorbent material 14 saturated with an aqueous electrolytic solution 16. Electrical contact between the positive side of a power supply 19 and the metal film 12 is made by means of metal contact 20 or through metal carrier 15 and sponge 14. The negative side of the power supply 19 is electrically connected to electrode 18 which comprises a suitable electronically conductive material, such as a metal plate, having deposited thereon a photoconductive layer 17, such as zinc oxide.

In operation of the apparatus of FIGURE 2, the roller 10 is removed to one side of the photoconductive layer 17. Then the photoconductive layer 17 is exposed to a light-image or electromagnetic radiation pattern to produce a latent pattern thereon. The light-struck areas of the photoconductive layer 17 become conductive and the nonlight-struck areas of layer 17 remain relatively nonconductive. The exposure is discontinued and roller 10 is rolled across the surface of photoconductive layer 17 while maintaining a suitable potential of about 12 volts between carrier 18 and metal surface 12. As the metal layer 12 is rolled across the surface of layer 17, electrolyte 16 is deposited on the surface of the metal and contact is made between layer 12 and electrolyte 16 and photoconductive layer 17 causing electrolysis and removal of metal from layer 12, exposing substrate 13. A positive reproduction of the latent pattern on photoconductive layer 17 is produced on substrate 13. When substrate 13 is white paper, the result is a positive print. When substrate 13 is a transparent plastic, such as Mylar, the result is a positive transparency. The print or transparency may be removed from roller 10 in completed form without further developing or fixing.

The electrolyte 16 may conveniently comprise a six to ten weight percent aqueous solution of cupric sulfate with Triton X–100 (alkyl aryl polyether alcohol) as a wetting agent. Photoconductive layer 17 as previously stated may comprise zinc oxide bonded to layer 18 by means of a suitable bonding agent, such as a copolymer of styrene and butadiene. Photoconductive layer 17 may also include a suitable dye as a sensitizer, such as Phosphine-R or Acridine Orange. The dye increases the sensitivity of photoconductive layer 17 to the visible range of light. In this embodiment, substrate or carrier 18 is opaque and may constitute a conventional aluminum, copper or brass plate.

The following examples are offered as a better understanding of the present invention and should not be construed as unnecessarily limiting thereto.

*Example I*

A suitable light-sensitive sheet material containing a photoconductor thereon and in which the backing is transparent to light may be prepared as follows: a flexible film of transparent cellulose acetate having a thickness of about 5 mils was first metalized on one surface by vapor deposition in a vacuum with a thin, smooth coating of gold. The coating had a surface resistance of about 3 ohms per square and transmitted about 40 percent of incident light in the visible range. Over this metal layer was then applied a suspension of 46 parts by weight French Process Zinc Oxide microcrystals with 0.02 weight percent (based on zinc oxide) Phosphine-R in a solution of 27 parts of toluene, 40 parts acetone, and 11 parts of Pliolite S–7 (a resinous copolymer of 30 weight percent butadiene and 70 weight percent styrene) serving as a binder, the mixture having been ground in a ball mill until smooth. After drying, the firmly bonded smooth white coating of zinc oxide was found to be about 0.8 mil in thickness.

Similarly, the reproduction carrier was prepared by vapor deposition of copper on a flexible film of transparent cellulose having a thickness of about 5 mils. The coating of copper was about 0.05 micron in thickness on one side of the transparent cellulose and found to have a surface resistance of about 0.5 ohm per square and transmission of 1 percent at a wavelength of 5000 A.

An electrolytic solution was prepared comprising copper sulfate in water. The amount of copper sulfate was about 6 to 10 weight percent of water. Triton X–100 was added to the electrolytic solution as a wetting agent. A positive light-image was focused on the surface of the photosensitive sheet containing the photoconductor. The source of light was a projector with a 300 watt bulb providing an intensity of about 300 foot-candles. Exposure was maintained for about five seconds. The above electrolytic solution was then applied to the metal surface of the reproduction carrier and to the photoconductive surface of the photosensitive sheet. The two sheets were then pressed together with the electrolytic coated surface facing each other and a potential of about 12 volts was applied between the metal surface of the reproduction carrier and the aluminum surface of the photosensitive sheet. The negative pole was connected to the light-sensitive sheet. and the positive pole was connected to the reproduction sheet. A current density of about 15 milliamperes per square centimeter in the light-struck areas was passed through the electrolyte for about one second. The two sheets were then stripped apart and the reproduction sheet was rinsed with water. The reproduction sheet was found to be a clear positive transparency. The dark areas of the reproduction sheet corresponded to the nonlight-struck areas of the photoconductive layer and the light or transparent areas of the reproduction sheet corresponded to the light-struck areas of the photoconductive layer. A negative image was reproduced on the photoconductive layer.

The ratio of zinc oxide to binder in the light-sensitive sheet could be effectively varied over a wide range. Best results were achieved with a ratio of zinc oxide to binder of about 8:1 to about 3:1. Electrically conductive glass plates can be substituted for the conductive carrier of the photosensitive layer without departing from the scope of this invention. Similarly, a glass substrate may be utilized instead of plastic for the reproduction sheet without departing from the scope of this invention.

Reproductions in accordance with this invention may be reduced 10 times or more from the original with good resolution. Instead of using negatives as the source of the image, the original object or print may be projected onto the photoconductive layer by conventional methods without departing from the scope of this invention. Thus, this system is a convenient, simple and inexpensive method of making microfilms of original documents. As previously stated, the method of this invention is particularly adaptable to the production of printed circuit boards and the like.

Various electrolytes and photoconductors may be used in the above combination without departing from the scope of this invention. Numerous modifications and alterations of the sheet material and the chemicals utilized will become apparent to those skilled in the art without departing from the scope of this invention.

Having described my invention, I claim:

1. A process for producing a reproduction which comprises exposing to a radiation pattern a photoconductive coating comprising a photoconductor selected from the group consisting of zinc oxide, indium oxide and cadmium sulphide, applying an electrolyte to the surface of the exposed photoconductive coating, contacting the electrolyte on the surface of the photoconductive coating with a metalized surface of a reproduction carrier having a base of different material from said metalized surface, and passing an electric current between said photoconductive coating as the cathode and said metalized surface as the anode through the electrolyte to visibly expose the reproduction carrier thereby reproducing the pattern on said reproduction carrier 2. A process for producing a reproduction which comprises exposing to a light-image a photoconductive carrier comprising a photoconductor selected from the group consisting of zinc oxide, indium oxide and cadmium sulphide bonded to the surface of an electrically conductive carrier, applying an electrolyte in aqueous solution to the surface of the exposed photoconductive carrier, contacting the electrolyte on the surface of the photoconductive carrier with a metalized surface of a non-metallic reproduction carrier, and passing an electric current between said conductive carrier as the cathode and said metalized surface as the anode through said electrolyte to visibly expose the reproduction carrier thereby reproducing the image on said reproduction carrier.

3. The process of claim 2 in which said reproduction carrier is transparent plastic.

4. The process of claim 2 in which said reproduction carrier is white paper.

5. The process of claim 2 in which said reproduction carrier is a metal plate different from the metal of said metalized surface.

6. The process of claim 2 in which said reproduction carrier is a glass plate.

7. The process of claim 2 in which the metal of said metalized surface is copper.

8. The process of claim 2 in which the metal of said metalized surface is nickel.

9. The process of claim 2 in which the metal of said metalized surface is silver.

10. The process of claim 2 in which the metal of said metalized surface is zinc.

11. The process of claim 2 in which the metal of said metalized surface is aluminum.

12. A process for producing a print which comprises exposing to a light-image a photoconductive coating comprising zinc oxide bonded to an electrically conductive carrier, applying an aqueous solution of an electrolyte to said exposed photoconductive coating, contacting the exposed photoconductive coating containing an electrolyte thereon with an opaque non-metallic white sheet containing a copper surface, passing an electric current between said carrier as the cathode and said copper surface as the anode to remove copper from said opaque sheet and to visibly expose said opaque white sheet in a pattern corresponding to said light image thereby producing a print.

13. A process for producing a transparency which comprises exposing to a light-image a photoconductive coating comprising zinc oxide bonded to an electrically conductive sheet, applying an aqueous solution of an electrolyte to said exposed photoconductive coating, contacting the exposed photocondutcive coating containing the electrolyte thereon with a non-metallic transparent sheet containing a copper surface, passing an electric current between said two sheets to remove copper from said transparent sheet and to visibly expose said transparent sheet in a pattern corresponding to said light image thereby producing a transparency; the conductive sheet containing the photoconductive coating being the cathode and the transparent sheet containing the copper surface being the anode.

14. A process for producing a lithographic off-set plate which comprises exposing to a light-image a photoconductive coating comprising zinc oxide bonded to an electrically conductive carrier, applying an aqueous solution of an electrolyte to said exposed photoconductive coating, contacting the exposed photoconductive coating containing the electrolyte thereon with an aluminum plate containing a copper surface, passing an electric current between said conductive carrier as the cathode and said aluminum plate as the anode to remove copper from said aluminum plate to visibly expose said aluminum plate in a pattern corresponding to said light image thereby producing an off-set plate.

References Cited in the file of this patent

UNITED STATES PATENTS

| | | |
|---|---|---|
| Re. 19,218 | Ruben | June 19, 1934 |
| 909,831 | Strecker-Aufermann | Jan. 12, 1909 |
| 2,115,399 | Ruben | Apr. 26, 1938 |
| 2,421,607 | Fowler | June 3, 1947 |
| 2,469,689 | Gresham | May 10, 1949 |
| 2,866,903 | Berchtold | Dec. 30, 1958 |

FOREIGN PATENTS

| | | |
|---|---|---|
| 151,971 | Germany | Dec. 28, 1902 |
| 464,112 | Great Britain | Apr. 12, 1937 |
| 215,754 | Australia | June 23, 1958 |

OTHER REFERENCES

Smith, R. A.: Semiconductors, Cambridge Press, 1959, pages 432, 33, 39, and 40.